United States Patent [19]

Casimir et al.

[11] 4,261,477
[45] Apr. 14, 1981

[54] MOTOR VEHICLE FUEL TANK VENTING DEVICE

[75] Inventors: Manfred Casimir, Esslingen; Wolf-Dieter Kurz, Stuttgart; Manfred Distel, Ostfildern, all of Fed. Rep. of Germany

[73] Assignee: Diamler-Benz Aktiengesellschaft, Stuttgart, Fed. Rep. of Germany

[21] Appl. No.: 134,675

[22] Filed: Mar. 27, 1980

[30] Foreign Application Priority Data

Mar. 28, 1979 [DE] Fed. Rep. of Germany ....... 2912214

[51] Int. Cl.³ .................. B65D 25/00; F16K 45/00
[52] U.S. Cl. .................. 220/85 VR; 220/20; 220/85 VS; 220/86 R
[58] Field of Search ............ 220/20, 85 R, 85 VR, 220/85 VS, 86 R

[56] References Cited

U.S. PATENT DOCUMENTS

| 3,643,690 | 2/1972 | Sarai | 220/86 R |
| 3,817,421 | 6/1974 | Andres | 220/85 VR |
| 3,907,153 | 9/1975 | Mutty | 220/86 R |
| 4,166,550 | 9/1979 | Klierschmit et al. | 220/20 |

Primary Examiner—George E. Lowrance
Attorney, Agent, or Firm—Craig & Antonelli

[57] ABSTRACT

A venting device for fuel tanks of vehicles, especially motor vehicles, with an equalizing chamber to be placed in the fuel tank close to and beneath an upper wall at approximately centrally relative to side walls of the fuel tank. The equalizing chamber is vented to the atmosphere through an equalizing line and is connected to vent lines on both sides running on an inside of the fuel tank at approximately the same height. The vent lines terminate freely in a vicinity of each side wall with a vent opening at one end. The vent lines preferably terminate at the side wall line opposite to the connection of the vent lines with the equalizing chamber. Each vent line, at the ends containing the vent opening, has a chamber within the tank with the chamber being vented to the interior of the fuel tank and with the vent openings of the respective vent lines terminating in the chamber.

29 Claims, 5 Drawing Figures

MOTOR VEHICLE FUEL TANK VENTING DEVICE

The present invention relates to a venting device and, more particularly, to a venting device wherein an equalizing chamber is adapted to be placed in the fuel tank close to and beneath an upper wall thereof approximately centrally relative to side walls of the fuel tank, with the chamber being vented to the atmosphere through an equalizing line and being connected to vent lines on both sides running inside of the fuel tank at approximately the same height, which vent lines terminate freely in a vinicity of each of the side walls, and with a vent opening at one end, preferably the side wall lying opposite the connection. Since vent openings of vent lines in venting devices of the aforementioned type are normally located relatively close to the surface of the liquid in the fuel tank, fuel may be forced into the vent lines when the surface of the liquid moves in conjunction with large quantities of gas to be vented especially when the vehicle is alternately making left and right hand turns. By virtue of the disposition of the vent openings of the vent lines it is possible for fuel to escape and run through the venting devices which is something which must absolutely be avoided.

In fuel tanks of vehicles, especially motor vehicles, a certain volume must be allowed for expansion above the level of fluid in the tank in a reliable fashion when filling the fuel tank with fuel. Primarily, as noted above, the escaping of fuel from the fuel tank must be prevented and, especially, if the vehicle should overturn or the tank be turned in dependence upon a positioning of the vehicle. Also, the escape of fuel must be prevented during normal and extreme operating conditions, that is, during all types of vehicle motions which occur during operation especially with a continuous alternating of travel along curves followed by straight line travel or from a lefthand curve to a righthand curve and vice versa. Additionally, the escape of fuel must also be reliably prevented when high volumes of gas to be vented develop in the fuel tank as a result of high fuel temperatures or an unsatisfactory boiling curve of the fuel used.

The aim underlying the present invention essentially resides in providing a venting device which fulfills the requirement of having the most compact design possible, something which is necessary especially in the case of installations of the fuel tank in motor vehicles, as well as the requirement of permitting equalization of pressure between the interior of the tank and the atmosphere.

In accordance with advantageous features of the present invention, a venting device for fuel tanks of vehicles, especially motor vehicles, is provided which includes an equalizing chamber to be placed in the fuel tank near and beneath the upper wall and approximately centrally relative to the side walls of the tank. The equalizing chamber is vented to the atmosphere through an equalizing line and is connected to vent lines on both sides running on an inside of the fuel tank at approximately the same height. The vent lines terminate freely in a vicinity of each of the side walls with a vent opening being provided at one end of the vent lines which vent opening is preferably disposed at a side wall lying opposite of the connection of the vent line with the equalizing chamber.

Advantageously, in accordance with the present invention, each vent line, at the end containing the vent opening has a chamber within the tank which chamber is vented to the interior of the tank with the vent opening terminating in such chamber.

By virtue of the provision of the above-noted chambers in a vicinity of the end segments of the vent lines, it is ensured that no fuel can enter the vent lines during all vehicle movements even when travelling around sharp curves. By virtue of the provision of the chambers a venting device for the fuel tanks of vehicles is provided which is simple, compact and inexpensive yet effectively solves the long-standing problem of the escape of fuel from a fuel tank under normal and especially under extreme conditions such as continuous travel around curves and with high fuel temperatures.

In accordance with further features of the present invention, each chamber has an opening and a locking device which controls the opening so as to enable a selective communication between the chamber and the interior of the tank. The locking device may, for example, be provided with a blocking element with the opening being preferably provided in a lower part of the chamber below the end section or vent opening of the associated vent line leading into the chamber.

Advantageously, the locking device of the present invention may be constructed in the manner of a blocking valve such as, for example, a check valve adapted to expose or uncover the opening of the chamber to allow free passage from the interior of the chamber to the interior of the tank but blocking passage in the opposite direction.

In accordance with the present invention, the blocking element of the locking device is tensionable by a movement of fluid in the tank and/or movement of the tank and/or by centrifugal forces, especially when the vehicle traverses, for example, a right hand curve or a left hand curve. More specifically, the blocking element may be disposed such that when the vehicle traverses a right hand curve, the blocking element is displaced into a blocked position and, in the opposite direction, i.e., going around a left hand curve, the blocking element is moved into an open position.

The blocking element of the locking device of the present invention is construced as a seat element such as, for example, a flap, plate, ball, or the like and the chambers are provided with a seat associated with the seat element in a vicinity of their openings.

The blocking element may be formed by a pendulum-like flap loosely hanging down vertically on the outside of the chamber in the vicinity of the opening with an associated seat of the flap on the chamber side being formed by a wall edge of the chamber which extends along the opening. Alternatively, the blocking element may be constructed as a valve ball which is held with play within a conical seat, which seat tapers in a blocking direction.

Additionally, the blocking element may be controlled by a float provided in the fuel tank or the blocking element may be constructed as a float.

Advantageously, in accordance with the present invention, the opening of each chamber and the associated locking device are disposed on that side of the chamber which is turned away from the side walls and faces the center of the tank. Preferably, the chambers are disposed approximately symmetrical with respect to the flap relative to a flap axis which runs at least approximately parallel to the longitudinal axis of the vehicle when the fuel tank is installed in the vehicle.

An equalizing opening is provided, for example, at the top of each chamber for venting each chamber to the interior of the tank. Preferably, the equalizing opening is so dimensioned in terms of its through-flow cross section that, on the one hand, the smallest possible amount of fluid in the tank can pass through the chambers and, on the other hand, the best possible and fastest possible pressure equalization takes place between the interior of the chamber and the interior of the tank. Additionally, the locking device is constructed so that it can be opened and any fluid in the tank can be allowed to escape from the interior of the chamber through the chamber openings.

Each chamber of the present invention is provided with a volume which is so selected that when the vehicle is travelling around the curve, the fluid in the tank, which has escaped through the equalizing opening and or through leaks in the locking device which blocks the opening of one chamber, remains at a distance below the vent opening of the associated vent line.

The end section of the respective vent line which leads into the chambers extends with its free end containing the vent opening approximately as far as the center of the respective chambers. Advantageously, the chamber openings locked by the blocking device has an aperture of about 2.5 cm². Additionally, when the volumes of gas to be vented from the tank are on the order of a magnitude of a maximum of 15 L/minutes, a cross section for the equalizing opening is chosen to be on the order of a magnitude of approximately 0.2 cm² and a chamber volume of about 100 cm³ is selected.

Accordingly, it is an object of the present invention to provide a venting device for fuel tanks of motor vehicles which avoids, by simple means, shortcomings and disadvantages encountered in the prior art.

Another object of the present invention resides in providing a venting device for a fuel tank which is extraordinarily compact so that is is extremely well suited for motor vehicles in which particular emphasis is placed upon a compact design with low weight.

A further object of the present invention resides in providing a venting device which is simple in construction and relatively inexpensive to manufacture.

Yet another object of the present invention resides in providing a venting device for fuel tanks of vehicles which permits equalization of pressure between the interior of the tank and the atmosphere.

A still further object of the present invention resides in providing a venting device for fuel tanks which provides a simple, compact, and, in particular, an inexpensive construction which effectively solves the long-standing problem of the escape of fuel from the fuel tank under normal and especially under extreme conditions such as continuous travel around curves and with high fuel temperatures.

These and other objects, features, and advantages of the present invention will become more apparent from the following description when taken in connection with the accompanying drawings which show, for the purposes of illustration only, several embodiments in accordance with the present invention, and wherein.

Figure 1:
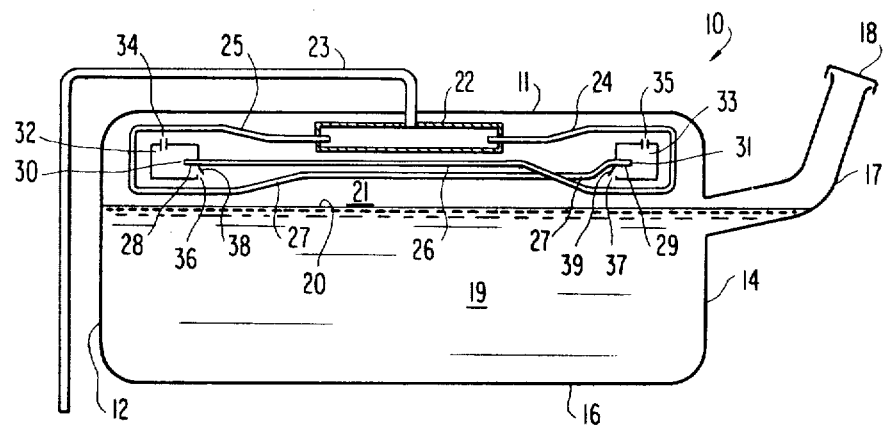
FIG. 1 is a partially schematic cross sectional view through a fuel tank of a motor vehicle having a venting device in accordance with the present invention arranged therein.
Figure 2:
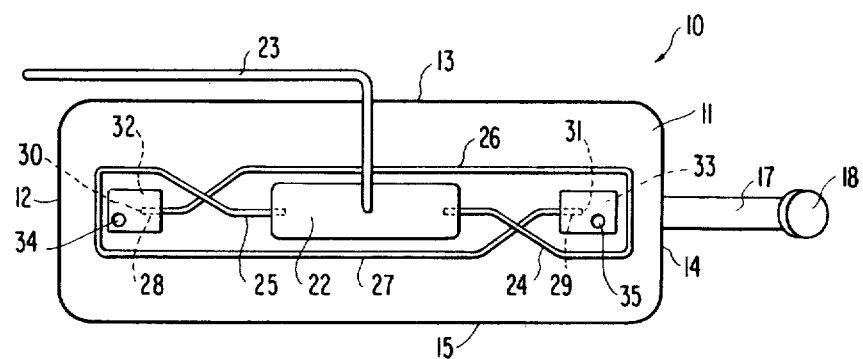
FIG. 2 is a top view of the fuel tank of FIG. 1.
Figure 4:
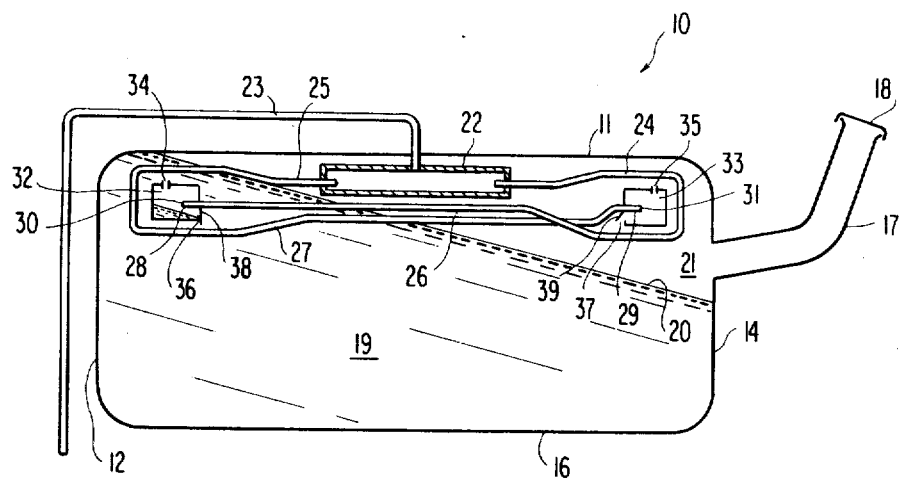
Figure 5:
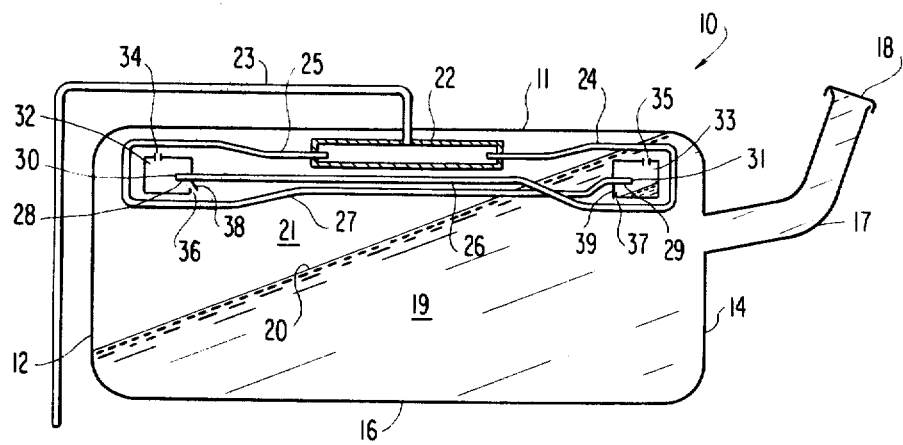

FIG. 4 is a cross sectional view of the fuel tank of FIG. 1 illustrating the position of the fuel and elements of the venting device of the present invention during travel of a motor vehicle around a right-hand curve; and FIG. 5 is a cross sectional view of the fuel tank of FIG. 1 illustrating the position of the fuel and elements of the venting device of the present invention during a travelling of the motor vehicle around a left-hand curve.

Referring now to the drawings wherein like reference numerals are used throughout the various views to designate like parts and, more particularly, to FIG. 1, according to this Figure, a fuel tank generally designated by the reference numeral 10 includes an upper wall 11, four side walls 12, 13, 14, 15 and a bottom wall 16 all of which are integrally formed with one another. A filling neck 17 extends from the side wall 14, at the right in FIG. 1, with the filling neck 17 being closed at its free end in a filling area by a tank cap 18.

While the fuel tank 10 in FIG. 1 is roughly the shape of a suitcase, with a plane of symmetry (not shown) which runs approximately parallel to the side walls 12 and 14 and along the center of the side walls 13 and 15, it is understood that the fuel tank 10 may be made in a wide variety of shapes. When the fuel tank 10 of FIG. 1 is installed in a motor vehicle, the above-noted plane of symmetry runs at least approximately parallel to the longitudinal axis of the motor vehicle. The longitudinal axis of the motor vehicle may then run within the plane of symmetry or to the right or left thereof.

In FIG. 1, the fuel tank is filled with fuel 19 and, at rest, the fuel 19 assumes a liquid level 20. When the motor vehicle traverses a right-hand curve, as shown in FIG. 4, the fuel 19 is forced to the left by centrifugal force so that the liquid level 20 assumes a sloping position. In the sloping position illustrated in FIG. 4, the fluid level 20, as shown in the drawing, rises from the right to the left. When the motor vehicle traverses a left-hand curve, as shown in FIG. 5, the fluid level 20 assumes the illustrated position with such level 20 rising from left to right.

The fuel tank 10 is provided with a venting device in accordance with the present invention which venting device includes an equalizing container 22, mounted inside the interior 21 of the fuel tank immediately below the upper wall 11 and approximately centrally relative to the side walls 12, 13, 14, 15. The equalizing container 22 is completely enclosed and vented to the exterior or atmosphere through an equalizing line 23. The equalizing line 23 communicates with the interior of the equalizing chamber 22 and is brought out to the outside of the fuel tank 10 through the upper wall 11 of the fuel tank 10 in a pressure tight and fluid-tight manner.

Two vent lines 24, and 25 are connected to the equalizing chamber 22 with the vent lines 24, 25 running close to an underside of an upper wall 11 and close to the level 20 of the fluid 19 in the interior 21 of the fuel tank 10. One vent line is connected to the right side of the equalizing container 22 with the other vent line 25 being connected to the left side of the equalizing container 22.

The vent line 24 extends from the connection point with the equalizing container 22 initially up to a vicinity of the side wall 14 of the fuel tank 10 and, at this point, the vent line 24 bends in approximately a U-shape and then extends with a section 26 back across the entire width of the fuel tank 10 approximately as far as the side wall 12. The other vent line 25 runs similarly but in an opposite direction and is connected to the equalizing container at the left end thereof. The vent line 25 has a section 27 beyond the U-shaped bend which section 27 runs approximately from the area of the left hand side wall 12 to approximately the area of the right hand side wall 14.

The vent lines 24 and 25 essentially run at the same height and terminate in a vicinity of the opposite side walls 12, 14 with an end segment 28 or 29. Each of the end segments 28 or 29 include a vent opening 30 or 31 at the end thereof.

Chambers 32 and 33 are disposed in the interior 21 of the fuel tank 10 with the vent openings 30 and 31 of the end sections 28 and 29 of the vent lines 24, 25 respectively terminating in an associated chamber 32 or 33.

The chambers 32 and 33 are each completely closed with the exception of the following provisions. More particularly, each chamber 32, 33 is vented to the interior 21 of the tank 10 by way of an equalizing opening 34 or 35 disposed in an upper part of each of the chambers 32, 33. The equalizing opening 34, 35 is located in the respective chambers 32, 33 as far upward as possible and, for example, preferably arranged within an upper wall of each of the chambers 32, 33.

Moreover, each chamber 32, 33 is provided in a lower part thereof, beneath the vent openings 30, 31 of the end sections 28, 29, with an opening 36 or 37. The openings 36, 37 have a relatively large cross section and each of the openings 36, 37 has associated therewith a locking device formed, for example, as a blocking element 38 or 39.

As shown most clearly in FIGS. 1, 4, and 5, the blocking or valving element 38, 39 may be formed as a flap which loosely hangs down in the manner of a pendulum in a vertical position against the associated chambers 32, 33. A valve seat on the chamber side is associated with the flap forming the blocking element 38, 39 which valve seat is formed by an edge of the wall of the chambers 32 or 33 which wall extends along openings 36, 37.

As evident from FIGS. 1, 2, 4, and 5, the chambers 32 and 33 are disposed approximately symmetrically with respect to the equalizing container 22 relative to the plane of symmetry of the fuel tank 10. The openings 36, 37 of each chamber 32, 33 are located as far as possible downwardly on a side of the respective chambers 32, 33 which faces the center of the fuel tank and which side is also turned away from the adjacent side wall 12 or 14. Consequently, the opening 36 of the chamber 32 is located on the wall side of the chamber 32 which faces away from the side wall 12 and this is also the case for the opening 37 of the other chamber 33. The openings 36, 37 of chambers 32, 33 are controlled and regulated by flaps forming the respective blocking elements 38 or 39. The flaps forming the blocking elements 38, 39 operate in the manner of a flap valve and, especially, as a check valve. The respective blocking elements 38, 39 selectively uncover the openings 36, 37 of the chambers 32, 33 to permit passage from the inside of the chambers 32, 33 to the interior 21 of the fuel tank 10 and also to selectively block the openings so as to prevent passage from the interior 21 of the fuel tank 10 to the interior of the chambers 32, 33.

As shown in FIG. 4, the respective flap-type blocking elements 38, 39 may be forced by the movement of fuel 10 and/or movement of the fuel tank 10 and/or centrifugal forces, particularly when the vehicle traverses a curve, into a blocking position covering the opening 36 and uncovering the opening 37 or, as shown in FIG. 5, the blocking element 38 may uncover the opening 36 while the blocking element 39 covers the opening 37.

It is also possible in accordance with the present invention, in a manner not shown in the drawings, to form each of the blocking elements 38, 39 of, for example, a plate, cone, or some other shaped valve element whereby the chambers 32, 33 in a vicinity of the openings 36, 37 would then be provided with valve seats adapted to cooperate with the so-shaped valve element.

Figure 3:
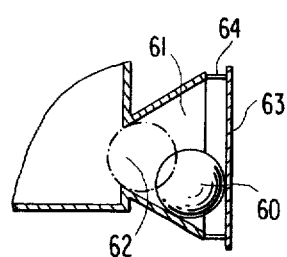
FIG. 3 is a detailed view, on an enlarged scale, of an embodiment of a blocking element of the venting device in accordance with the present invention.

FIG. 3 provides an example of a modification of a blocking element which is constructed as a valve ball held with play within a valve seat 61. The valve seat 61 is conically shaped and tapers in a blocking direction, i.e., toward the left in FIG. 3. A chamber opening 62 of the valve seat 61, corresponding to the openings 36, 37 described hereinabove, is provided for communicating the interior of the chambers with the interior 21 of the fuel tank 10. The valve ball 60 is prevented from falling out of the valve seat 61 by a stop cover 63 which is held in place by ribs 64 provided on the conical seat 61.

It is also possible in accordance with the present invention to construct the blocking elements so as to be controllable by a float arranged in the fuel tank or to construct the respective blocking elements proper as a float.

The upper equalizing openings 34, 35 of the chambers 32, 33 are so dimensioned in terms of their through flow cross section that, on the one hand, the openings 34, 35 permit the smallest possible amount of fuel 19 to pass through into chambers 32, 33 and, on the other hand, permit optimum and rapid pressure equalization between the interior of the chambers 32, 33 and the interior 21 of the fuel tank 10 and also to achieve an opening of the blocking element 38 (FIG. 4) or 39 (FIG. 5) which is closed depending upon the direction of travel and flow of fuel 19 which has then accumulated inside the chamber 32 or 33 through the openings 36, 37 in the chambers 32, 33.

The volume of each chamber 32, 33 is selected so that when traversing a curve such as, for example, a right hand curve shown in FIG. 4 or a left hand curve shown in FIG. 5, the fuel 19 which has penetrated through the equalizing opening 34 or 35 and/or by virtue of leakage between the flap 38, 39 which blocks the openings 36, 37 of the chambers 32, 33, which reaches the interior of the chambers 32, 33 remains at a distance below the vent opening 30 or 31 of the associated vent line 24 or 25 so that the fuel 19 cannot enter the vent lines.

As shown in FIGS. 4 and 5, preferably the free ends of the end sections 28 or 29 containing the vent openings 30, 31 of the vent lines 24, 25 which lead into the respective chambers 32, 33 extend approximately as far as the middle or center of the associated chambers 32, 33.

The openings 36, 37 of the chambers 32, 33 are dimensioned such that, for example, the size of the cross section is about 2.5 cm$^2$. With venting gas volumes up to a maximum of 15 L/minutes, preferably, each chamber 32 or 33 has a volume of 100 cm$^3$ and each equalizing opening 34, 35 has a cross section on the order of approximately 0.2 cm$^2$.

Without providing chambers 32 or 33, because of the disposition of the end sections 28, 29 of the vent lines 24, 25 near to the level 20 of the fuel 19, a situation is created wherein, when the level of fuel 19 moves in conjunction with large quantities of fuel to be vented when the fuel is at a high temperature, especially when the motor vehicle is making alternate right and left curves, the fuel 19 is forced into the vent lines 24, 25. The fuel 19 then enters the equalizing chamber 22 and would escape to the outside through the equalizing line 23. This escaping of the fuel 19 through the equalizing line 23 must be prevented and such prevention is accomplished by the present invention in the following manner.

The chambers 32, 33, located in an area of the end sections 28, 29 of the vent lines 24, 25 ensure that when the motor vehicle moves, including movements of the fuel tank 10 and especially of the fuel 19, that no fuel in the fuel tank 10 can enter the vent lines 24, 25.

More particularly, as shown in FIG. 1, when the vehicle is travelling in a straight line, the level 20 of the fuel 19 in the fuel tank 10 is located relatively far below the chambers 32, 33 and associated openings 36, 37. However, if the vehicle traverses a right hand curve, as shown in FIG. 4, the level 20 of the fuel will assume a sloping position and by virtue of such sloping position, the blocking element 38 of the chamber 32 is forced into the blocking position by the force of the fuel such that the flap-type blocking element 38 closes the opening 36 in the chamber 32. This means that when the opening 36 is tightly sealed, fuel 19 cannot enter the interior of the chamber 32 through the opening 36. However, fuel 19 which does manage to enter the chamber 32 through slight leaks or through the upper relatively small equalizing opening 34 in the chamber 32 is, as shown in FIG. 4, a very slight quantity. It is understood that this slight quantity of fuel 19 inside the chamber 32 is not capable of moving the flap-type blocking element 38 from the closed position shown in FIG. 4 to the open position. Therefore, the chamber 32 remains closed during travel of the motor vehicle around the right hand curve and entry of fuel 19 into the vent opening 30, length 26 of the vent line 24, and equalizing chamber 22 is effectively prevented.

During travel around a right hand curve, as also shown in FIG. 4, there is no danger that the fuel will enter the other vent line with the right hand vent opening 31 and here the conditions at the chamber 32 approximately correspond to those illustrated in FIG. 1.

With the motor vehicle travelling in a straight line, around a right hand curve (FIG. 4) or around a left hand curve (FIG. 5), the following events occur in the chamber 32. The pressure of the fuel 19 on the fuel side of the blocking element 38 drops on the outside of the flap type blocking element 38 and the blocking element 38 can therefore open automatically and uncover the opening 36. The small amounts of fuel contained in the chamber 32 pass through the opening 36 under the influence of gravity and centrifugal force out of the chamber 32. For the chamber 32 to be drained in this fashion, it is important to have the equalizing opening 34 on the top of the chamber 32 and to properly size the equalizing opening 34. This proper sizing and disposition of the equalizing opening prevents a pressure build-up between the interior 21 of the fuel tank 10 and the interior of the chamber 32 with large volumes of gas to be vented since such a pressure build-up would otherwise keep the flap-type blocking element continuously closed. On the other hand, the equalizing opening 34 is sufficiently large so as to permit the pressure equalizing described above and to ensure that, with the transistion from the state shown in FIG. 4 to, for example, that shown in FIG. 1 or 5, the blocking element may open and permit the fuel to flow out of the chamber 32.

The state illustrated in FIG. 5 results when the motor vehicle travels around a left hand curve and, under these conditions, the right hand chamber 33 is subjected to the action of the fuel 19 in such a manner that the blocking element 39 is forced into and held in a closed position by the pressure of the fuel 19. Otherwise, the conditions regarding the chamber 32 are the same as described hereinabove in connection with the example of FIG. 4 for the chamber 32.

The venting device of the present invention permits pressure equalization between the interior 21 of the fuel tank 10 and the atmosphere and also allows a certain amount of volume for expansion above the fluid level 20 when the vehicle's fuel tank 10 is filled. In particular, a situation is created in which the fuel 19 can neither run out if the vehicle should overturn into any position, nor under normal operating conditions, nor even under extreme operating conditions. In other words, during movements of the vehicle such as travel around the curve, continuous alternation from travel around curves to travel in a straight line, or from a right hand curve to a left hand curve and vice versa, during all of these movements of the vehicle and variations in the fluid level 20 during travel, escape of fuel 19 is effectively prevented by virtue of the fact that, in all of these conditions, the fuel 19 does not enter the vent line 24 and/or 25 and cannot escape from there to the outside through the equalizing container 22 and equalizing line 23. Additionally, the escape of fuel is reliably and effectively prevented when large volumes of gas to be vented are produced as a result of high temperatures of the fuel 19.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A venting device for a vehicle fuel tank, the venting device including an equalizing chamber adapted to be disposed within an interior of the fuel tank at a position near to and beneath an upper wall of the fuel tank and approximately centrally relative to side walls of the fuel tank, equalizing line means for venting the equalizing chamber means to the atmosphere, a first vent line means extending from a first side of the equalizing chamber means to a vicinity of one side wall of the fuel tank, a second vent line means extending from a second side of the equalizing chamber means opposite to the first side to a vicinity of a second side wall of the fuel tank opposite the first side wall, the vent line means are disposed in the interior of the fuel tank at approximately the same height and each vent line means terminates in a free end having a vent opening, characterized in that one further chamber means is associated with each of the vent line means, the further chamber means are arranged in the interior of the fuel tank and the vent line means extend into the respective chamber means with the vent openings of the vent line means terminating in the further chamber means, and in that means are provided for venting the respective further chamber means to the interior of the fuel tank.

2. A venting device according to claim 1, characterized in that the venting means includes an opening provided in each of the further chamber means, and in that means are provided on each of the further chamber means for selectively controlling an opening and closing of an associated opening.

3. A venting device according to claim 2, characterized in that the selective controlling means includes a blocking means, and in that the openings are disposed on a lower part of the respective further chamber means at a position below a position in which the vent openings of the respective vent line means terminate in the further chamber means.

4. A venting device according to claim 3, characterized in that the blocking means is constructed as a blocking valve including a blocking element adapted to open an opening of the associated further chamber means to allow free passage from an interior of the chamber means to the interior of the fuel tank and block passage in an opposite direction.

5. A venting device according to claim 4, characterized in that the blocking element is arranged at the respective further chamber means so as to be tensioned by a movement of at least one of the fuel in the fuel tank, a movement of the fuel tank, and centrifugal forces which occur when the vehicle traverses a curve such that the blocking element of the respective further chamber means moves into the first position and the second position in dependence upon a direction on the curve traversed by the vehicle.

6. A venting device according to one of claims 4 or 5, characterized in that the blocking element is constructed as one of a plate-shaped or flap-shaped valve member, and in that each of the further chamber means is provided with a valve seat cooperable with the blocking element.

7. A venting device according to one of claims 4 or 5, characterized in that the blocking element includes a pendulum-like flap member disposed on each of the further chamber means so as to loosely vertically hand down on an outside of the associated further chamber means, and in that each of the further chamber means includes a valve seat formed by a wall edge of the further chamber means which extends along the associated opening.

8. A venting device according to one of claims 4 or 5, characterized in that the blocking element is constructed as a valve ball, a conical seal is arranged at the openings of the respective further chamber means for holding the valve ball thereat, and in that the valve seat tapers in a blocking direction.

9. A venting device according to one of claims 4 or 5, characterized in that a float means is operatively connected with the blocking element for controlling a positioning thereof.

10. A venting device according to one of claims 4 or 5, characterized in that the blocking element is constructed as a float.

11. A venting device according to one of claims 3, 4, or 5, characterized in that the opening provided in each of the further chamber means is disposed on a side of the respective further chamber means which faces away from the side walls of the fuel tank so that the respective openings face a center of the fuel tank.

12. A venting device according to claim 11, characterized in that the further chamber means are disposed approximately symmetrical with respect to a plane of symmetry which extends approximately parallel to a longitudinal axis of the vehicle when the fuel tank is installed in the vehicle.

13. A venting device according to claim 12, characterized in that the means for venting the respective further chamber means to the interior of the fuel tank includes an equalizing opening provided in each of the further chamber means in an upper part thereof.

14. A venting device according to claim 13, characterized in that each equalizing opening has a through-flow cross section dimensioned such that the smallest possible amount of fuel in the fuel tank can pass through the equalizing opening into the respective further chamber means and such that the fastest possible pressure equalization is effected between the interior of each of the further chamber means and the interior of the fuel tank, and in that the blocking means is adapted to open the associated openings so as to enable fuel in the fuel tank to escape from the respective further chamber means into the interior of the fuel tank through the respective openings associated with the blocking means.

15. A venting device according to claim 14, characterized in that each of the further chamber means has a volume which enables an accommodation of fuel therein, which enters through at least one of the equalizing openings or a leakage at the blocking means, at a level which is at a distance below the vent opening of the vent line means associated with the respective further chamber means.

16. A venting device according to claim 15, characterized in that free ends of the vent line means terminate in the associated further chamber means approximately at a center of the associated further chamber means.

17. A venting device according to claim 16, characterized in that each of the openings of the further chamber means associated with the blocking means has a cross section of about 2.5 $cm^2$.

18. A venting device according to claim 17, characterized in that each of the equalizing openings has a cross section of approximately 0.2 $cm^2$ and each of the further chamber means has a volume of about 100 $cm^3$ when volumes of gas to be vented from the fuel tank are on the order of a maximum of 15 L/minutes.

19. A venting device according to one of claims 1, 2, 3, 4, or 5, characterized in that the further chamber means are disposed approximately symmetrical with respect to a plane of symmetry which extends approximately parallel to a longitudinal axis of the vehicle when the fuel tank is installed in the vehicle.

20. A venting device according to one of claims 1, 2, 3, 4, or 5, characterized in that the means for venting the respective further chamber means to the interior of the fuel tank includes an equalizing opening provided in each of the further chamber means in an upper part thereof.

21. A venting device according to claim 20, characterized in that each equalizing opening has a through-flow cross section dimensioned such that the smallest possible amount of fuel in the fuel tank can pass through the equalizing opening into the respective further chamber means and such that the fastest possible pressure equalization is effected between the interior of each of the further chamber means and the interior of the fuel tank, and in that the blocking means is adapted to open the associated openings so as to enable fuel in the fuel tank to escape from the respective further chamber means into the interior of the fuel tank through the respective openings associated with the blocking means.

22. A venting device according to claim 21, characterized in that free ends of the vent line means terminate in the associated further chamber means approximately at a center of the associated further chamber means.

23. A venting device according to claim 22, characterized in that each of the openings of the further chamber means associated with the blocking means has a cross section of about 2.5 cm$^2$.

24. A venting device according to claim 23, characterized in that each of the equalizing openings has a cross section of approximately 0.2 cm$^2$ and each of the further chamber means has a volume of about 100 cm$^3$ when volumes of gas to be vented from the fuel tank are on the order of a maximum of 15 L/minutes.

25. A venting device according to claim 2, characterized in that the means for selectively opening and closing the opening provided in each further chamber means includes a blocking means, said blocking means is constructed as one of a flap or plate-type valve member, and in that each of the further chamber means is provided with a valve seat disposed in a vicinity of their associated openings.

26. A venting device according to claim 2, characterized in that the means for selectively opening and closing the opening provided in each further chamber means includes a blocking means, said blocking means is constructed as a pendulum-like flap member disposed on each of the further chamber means so as to loosely vertically hang down on an outside of the associated further chamber means, and in that each of the further chamber means includes a valve seat formed by a wall edge of the further chamber means which extends along the associated opening.

27. A venting device according to claim 2, characterized in that the means for selectively opening and closing the opening provided in each of the further chamber means includes a blocking means, the blocking means is constructed as a valve ball, a conical seat is arranged at the openings of the respective further chamber means for holding said valve ball thereat, and in that the valve seat tapers in a blocking direction.

28. A venting device according to claim 2, characterized in that the means for selectively opening and closing the opening provided in each of the further chamber means includes a blocking means, and in that a float means is operatively connected with the blocking means for controlling a positioning thereof.

29. A venting device according to claim 2, characterized in that the means for selectively opening and closing the opening provided in each of the further chamber means includes a blocking means, and in that said blocking means is constructed as a float.

* * * * *